(No Model.) 4 Sheets—Sheet 4.

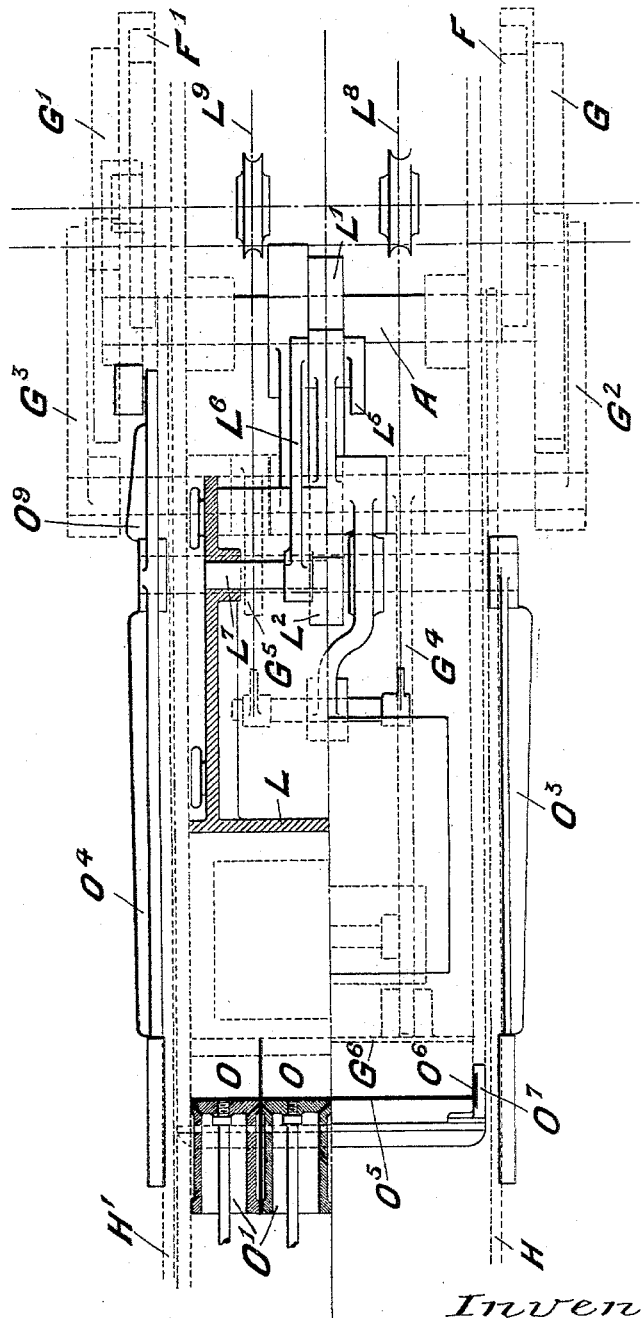

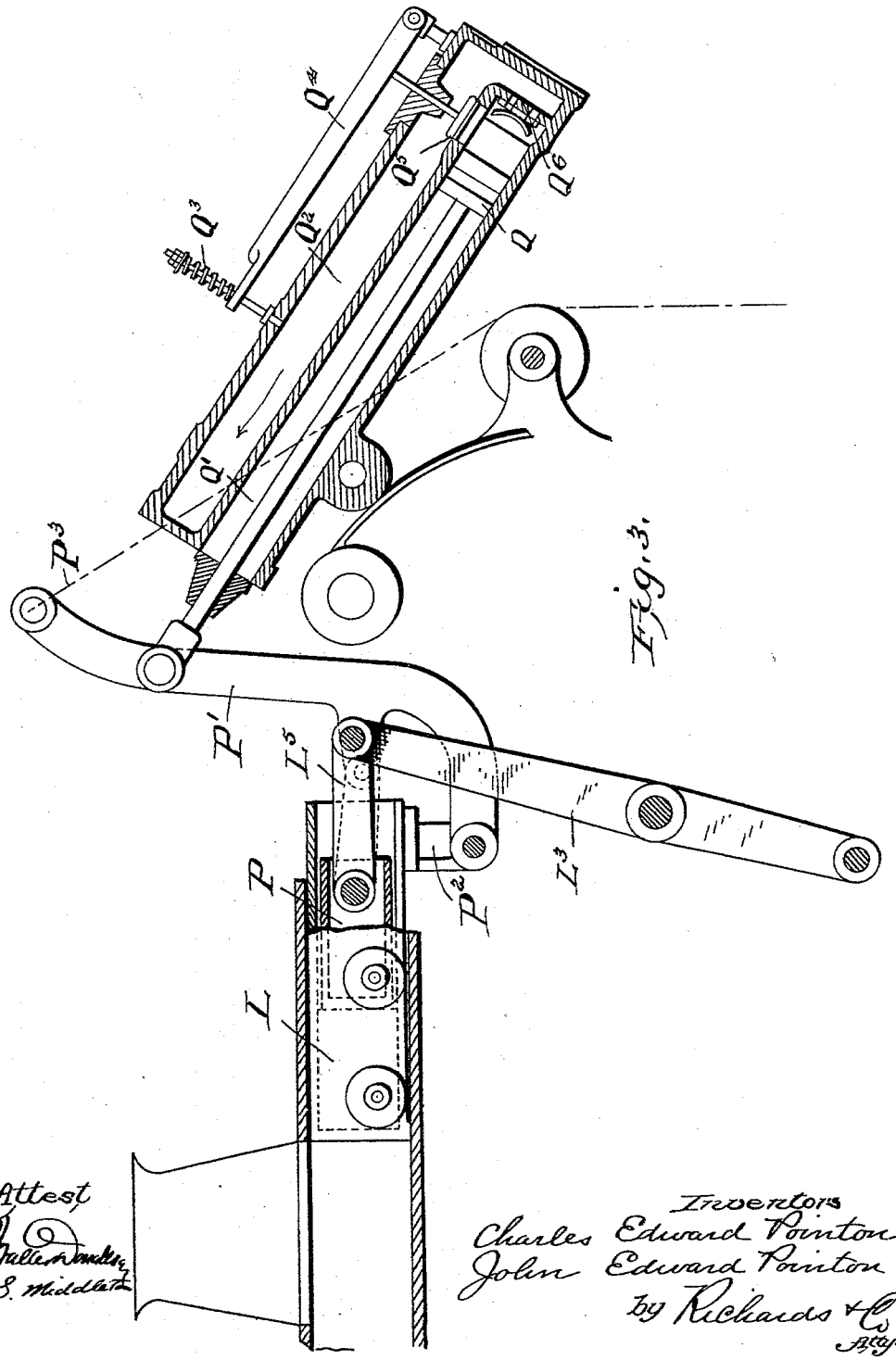

C. E. & J. E. POINTON.
MACHINE FOR DIVIDING DOUGH FOR BREAD MAKING, &c.

No. 597,089. Patented Jan. 11, 1898.

Witnesses:
Inventors:
Charles Edward Pointon
John Edward Pointon
By their Attorneys.

UNITED STATES PATENT OFFICE.

CHARLES EDWARD POINTON AND JOHN EDWARD POINTON, OF WELLINGTON, ENGLAND.

MACHINE FOR DIVIDING DOUGH FOR BREAD-MAKING, &c.

SPECIFICATION forming part of Letters Patent No. 597,089, dated January 11, 1898.

Application filed February 25, 1897. Serial No. 625,023. (No model.)

*To all whom it may concern:*

Be it known that we, CHARLES EDWARD POINTON and JOHN EDWARD POINTON, subjects of the Queen of Great Britain, residing at Wrekin Road, Wellington, in the county of Salop, England, have invented certain new and useful Improvements in Machines for Dividing Dough for Bread-Making, &c., of which the following is a specification.

This invention consists of improvements relating to machinery for dividing a mass of dough or like material into a number of pieces of uniform weight and consistency for the making of loaves of bread, cakes, or for other purposes, our object being to simplify such machinery and render the same more effective and reliable in working.

We will describe our invention by reference to the four accompanying sheets of explanatory drawings to be hereinafter referred to.

Figure 1:
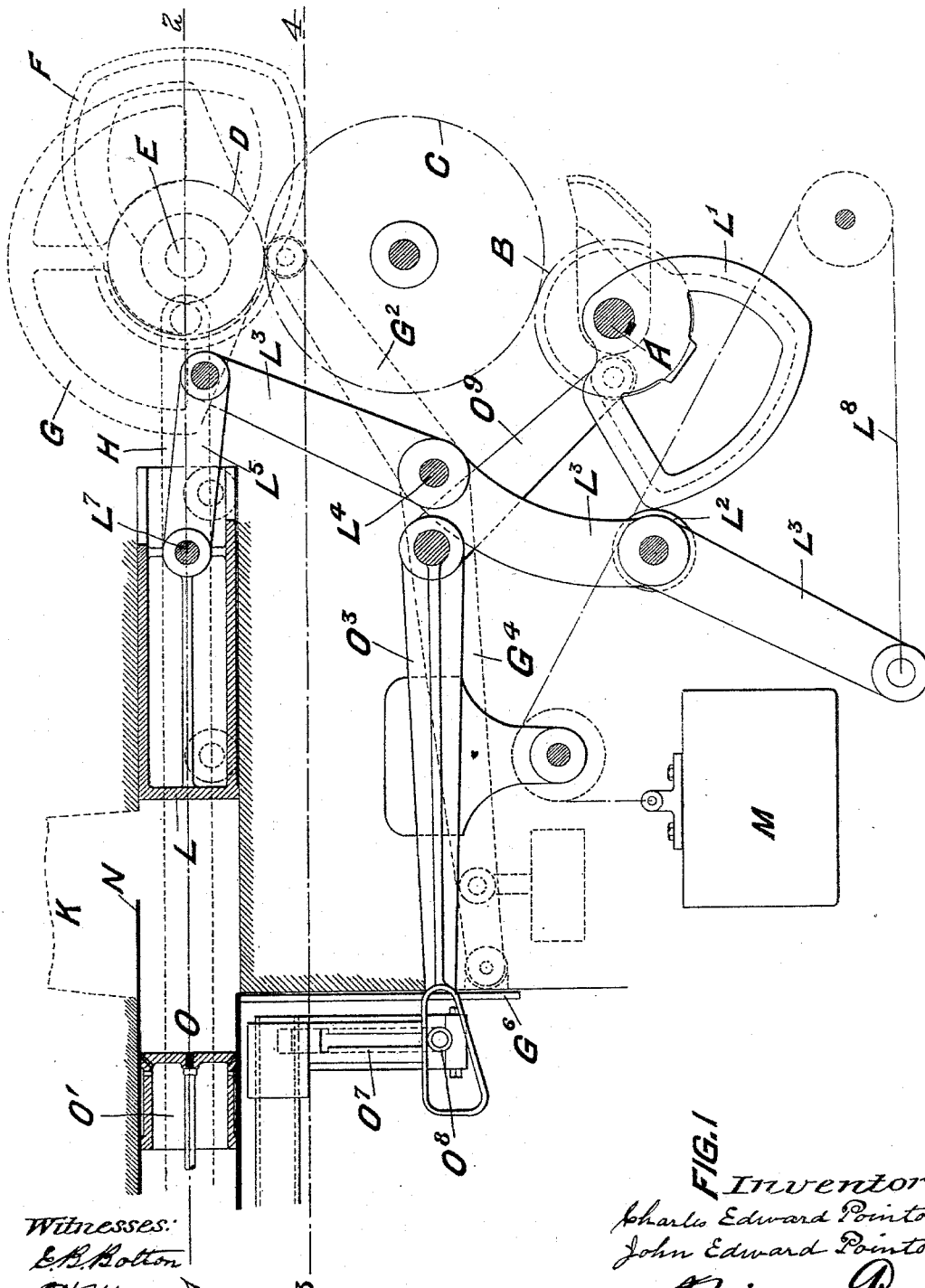
Figure 7:
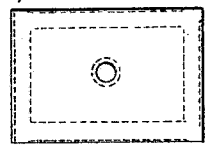
Figure 6:
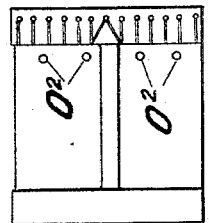
Figure 8:
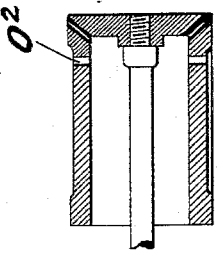
Figure 4:
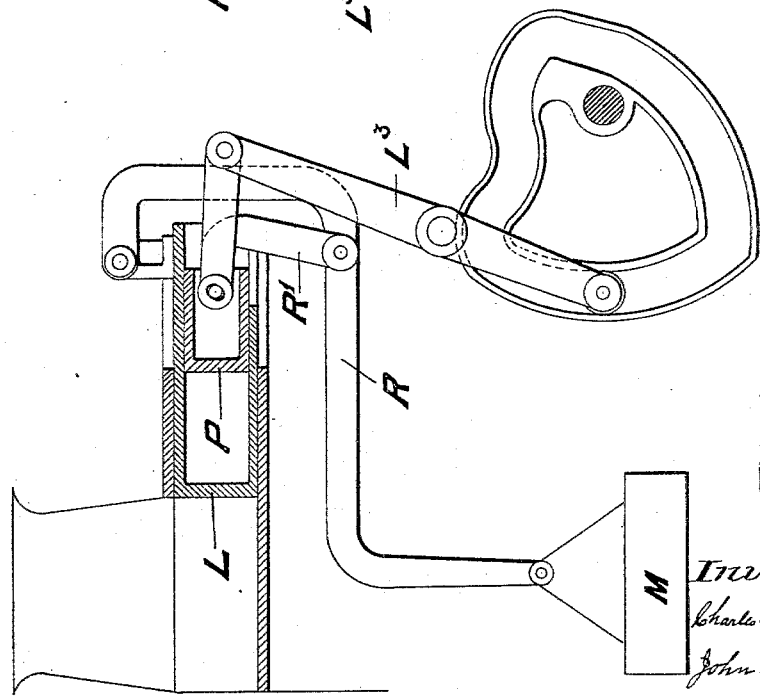

Figure 1 is a sectional side elevation representing the general arrangement of the mechanism or parts of a dough-dividing machine constituting our invention. The framing of the machine is not shown and is only represented by sectional lines where it is necessary for the purpose of making clear the disposition of the mechanism. Fig. 2 is a sectional plan of the mechanism, one half through the line 1 2, Fig. 1, and the other half through the line 3 4, Fig. 1. Fig. 3 is a sectional side elevation showing the combination of the reciprocating forcer with a hydraulic cataract to check the return movement of such forcer. Fig. 4 is a sectional side elevation, and Fig. 5 an end elevation, representing the combination of the reciprocating forcer with a weighted lever arranged to partake of the movement of the forcer. Figs. 6, 7, and 8 are detail views, to a larger scale, representing in a side elevation, end elevation, and sectional plan one of the plungers for discharging the divided portions of dough from the boxes or receptacles, showing the disposition of the vents for the escape of air or gas from the dough when it is pressed into the boxes or chambers.

The same reference-letters in the different views indicate the same parts.

Referring to Figs. 1 and 2, the improvements constituting our invention are represented by full lines, while the other portions of the machine, to which reference will be made only to assist in the comprehension of our improvements, we have represented chiefly by dotted lines.

A is the main or first-motion shaft of the machine, which is driven in any suitable manner, and from this shaft the whole of the mechanism is set in motion. By means of the gearing-wheels B, C, and D the shaft E is caused to revolve when the main shaft is set in motion, and upon the said shaft E the cams F F' are mounted for operating the side links H H', by which a reciprocating motion is imparted to the division boxes or chambers O and also to the plungers O', which work therein. The cams G G' are also mounted on the shaft E for the producing by means of the levers $G^2$, $G^3$, $G^4$, and $G^5$ a rising-and-falling motion of the knife $G^6$ for cutting or dividing the separated portions of dough from the mass which is placed within the hopper K.

The whole of the mechanism hereinbefore described and indicated by the reference-letters in the drawings forms no part of our improvements, but are of course essential with other parts (not described) to the working of the dough-dividing machine.

We will now describe the improvements constituting our invention.

The reciprocating forcer L, which is made of a hollow form and open at the outer end, as illustrated, is operated by means of the cam L' on the main shaft A, such cam acting on the roller $L^2$, mounted upon the lever $L^3$. The said lever $L^3$, which is formed in one piece, has its fulcrum at $L^4$ and is connected at its upper end by the links $L^5$ $L^6$ to the pin $L^7$, secured to the forcer L. The portion of the lever between the fulcrum $L^4$ and roller $L^2$ is curved, as illustrated at Fig. 1, to give sufficient space or clearance for the working of the cam L'. The lower end of the lever $L^3$ is connected by the chains $L^8$ $L^9$ to the weight M, suitable guide-pulleys being arranged in the manner illustrated in order that the instroke of the forcer L shall be produced by the descent of the said weight M. On such instroke a portion of dough from the hopper K is forced under the knife N and is thus separated from the mass, and is then again divided into the required pieces by the continued forward movement of the forcer, which presses it into the boxes or chambers O, each of which contains a plunger O'.

As the force or energy imposed upon the forcer L by the weight M is practically uniform, it follows that the pressure imposed upon the dough will also be uniform, and thus on each instroke of the forcer an equal portion of dough is cut away from the mass in the hopper and accurately subdivided into the required portions, which will have no appreciable variation in consistency or weight. In the event of the dough in the hopper being of less consistency than its usual or normal consistency its resistance to the early part of the instroke of the forcer will be less, and the weight M will cause the forcer to make a longer stroke until sufficient dough has been forced into the division boxes or chambers to offer the resistance required to arrest the descent of the weight M and thus to bring the forcer L to rest. If, on the other hand, the dough has an excess of density, its resistance will be greater and the stroke of the forcer correspondingly shorter, owing to the earlier arrest of the descent of the weight. By employing such a simple combination of mechanism we provide an effective means whereby a dough-dividing machine will automatically adjust itself to meet any given condition of the dough in a more efficient manner than has been found possible hitherto, for whatever variation may occur in the consistency of the dough we can insure by our improvements that it shall be divided into portions of uniform weight.

On the forcing of the dough into the boxes or chambers O, whose back or outer ends are closed by the plungers O', we have found it necessary to provide means for the escape of any air or gas that may be contained within the dough and which, if not removed, would cause irregularities in the weights of the divided portions. We therefore arrange vents at the closed end of each plunger O', as illustrated more clearly in the detail views, Figs. 6, 7, and 8, which permit of the escape of the confined air or gas to the hollow interior of the plungers and thence to the external atmosphere. The apertures $O^2$, Figs. 6 and 8, are for the escape of small particles of dough which may be forced between the bearing-surfaces of the plungers and the sides of the chambers.

The levers $O^3$ and $O^4$ are for the purpose of producing a rising-and-falling motion of the scraper $O^5$, which is provided at each end with a block $O^6$ to slide within a vertical guide $O^7$. The block $O^6$ has a roller $O^8$ on its outer face, which takes the pressure from the slotted end of the lever $O^3$. The lever $O^4$ is provided with an extension $O^9$, carrying a roller at its extremity for working against a cam secured to the main shaft A. The purpose of the rising-and-falling scraper $O^5$ is to scrape or cut away the divided portions of dough from the faces of the plungers O'.

In the arrangement of the forcer L in combination with the cataract or hydraulic check, as illustrated at Fig. 3, a pair of operating-levers, such as $L^3$, are worked by cams which cause the forcer L to perform both its instroke and outstroke, the connection with the cams being made at the lower end of each lever. The upper end of each lever is connected by a link $L^5$ with a sliding plate P in the interior of the forcer L. The plate P is also connected with the lever P', pivoted to a bracket $P^2$, which is attached to the under side of the forcer L. A weight is suspended by a chain $P^3$ to the upper or outer end of the lever P'. On the instroke or working stroke the plate P and forcer L will move together if the dough is of normal consistency, and thus offers no undue obstruction to the motion; but in the event of such obstruction the forcer L will be brought to rest, while the plate P will be caused to slide within the forcer, carrying with it the lever P', which turns on its fulcrum carried by the bracket $P^2$ until the complete stroke due to the shape and dimensions of the cam operating the lever $L^3$ is completed; but with such an arrangement we find that the return stroke of the forcer L is effected with great violence, owing to the very slight obstruction offered to the descent of the weight suspended by the chain $P^3$, and to prevent such violent action we combine a hydraulic check cylinder or cataract with the lever P' in the manner illustrated at Fig. 3. On the return stroke of the forcer, under the influence of the weight suspended by the chain $P^3$, the piston 2 is driven in the direction opposite to that indicated by the arrow, but its motion is retarded by the water or other liquid in front of it in the cylinder Q', and which must escape to the chamber $Q^2$ as the piston advances in the direction indicated. The pressure required upon the water to cause it to escape into the chamber $Q^2$ is regulated by the adjustment of the spring $Q^3$, acting upon the lever $Q^4$, which closes the escape-valve $Q^5$, and in this manner we are enabled to so retard the return stroke or outstroke of the forcer L as to prevent any excessive shock or strain upon any part of the machine. On the instroke or working stroke of the forcer L the piston Q is caused to travel in the direction indicated by the arrow, and during such movement water, oil, or other liquid is drawn into the cylinder Q' through any suitable suction-valve $Q^6$. The hydraulic check or cataract is pivoted in a suitable position upon the framing of the machine, and can thus adjust itself to the varying positions assumed by the lever P'.

Figure 5:
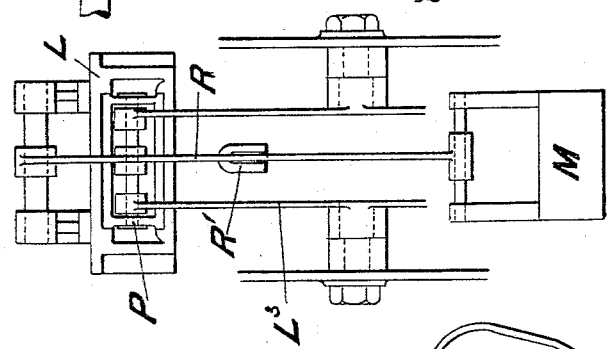

With the arrangement of the forcer L in combination with a weighted lever, as shown at Figs. 4 and 5, we also employ an inner sliding plate P, such as hereinbefore described in reference to Fig. 3, but such plate, in addition to its connection with the cam-operated lever $L^3$, is connected by the link $R'$ with the lever R, pivoted at its upper end to a bracket secured to the upper side of the forcer L and having a weight M attached to its lower end. On the instroke or working stroke the plate P, the forcer L, and the lever R and weight M will all move together if the dough is of the usual or normal consistency; but in the event of an undue obstruction by the dough the forcer L, lever R, and weight M will be brought to rest early in the stroke, while the plate P will complete its stroke independently without imparting any movement to the weight M. On the return stroke the whole of the parts will move together, but by arranging them or combining them in the manner illustrated no shock or strain will be imposed upon the machine during such return stroke.

Having now described our invention, what we claim as new, and desire to secure by Letters Patent, is—

1. In combination with the dough-receptacle, the ram or forcer comprising the inner and outer parts, means for operating the inner part positively, a yielding connection between said inner and outer parts, and a checking or buffing device controlling the return of said yielding connection to normal position.

2. In combination with the dough-receptacle, the ram or forcer comprising the inner and outer parts, means for operating the inner part positively, the weighted lever pivoted to the outer part, the connection between said lever and inner part, and the check or buffer for controlling the return movement of said lever, substantially as described.

3. In combination with the dough-receptacle, the ram or forcer comprising the inner and outer parts, means for positively operating the inner part, the weighted lever pivoted to the outer part, the connection from said lever to the inner part, and the checking device connected to said lever and comprising the cylinder, the piston therein having a connection to the lever, and the reservoir having ports communicating with said cylinder, substantially as described.

In witness whereof we have hereunto set our hands in presence of two witnesses.

CHARLES EDWARD POINTON.
JOHN EDWARD POINTON.

Witnesses:
EDWARD MARKS,
HERBERT BOWKETT.